F. W. HIBBS.
WIND PROPELLED TURBINE MOTOR.
APPLICATION FILED JAN. 18, 1910.

1,008,148.

Patented Nov. 7, 1911.
5 SHEETS—SHEET 1.

Witnesses
W. Max. Duvall
B. B. Collings

Inventor
F. W. Hibbs
Wilkinson, Fisher & Witherspoon
Attorneys

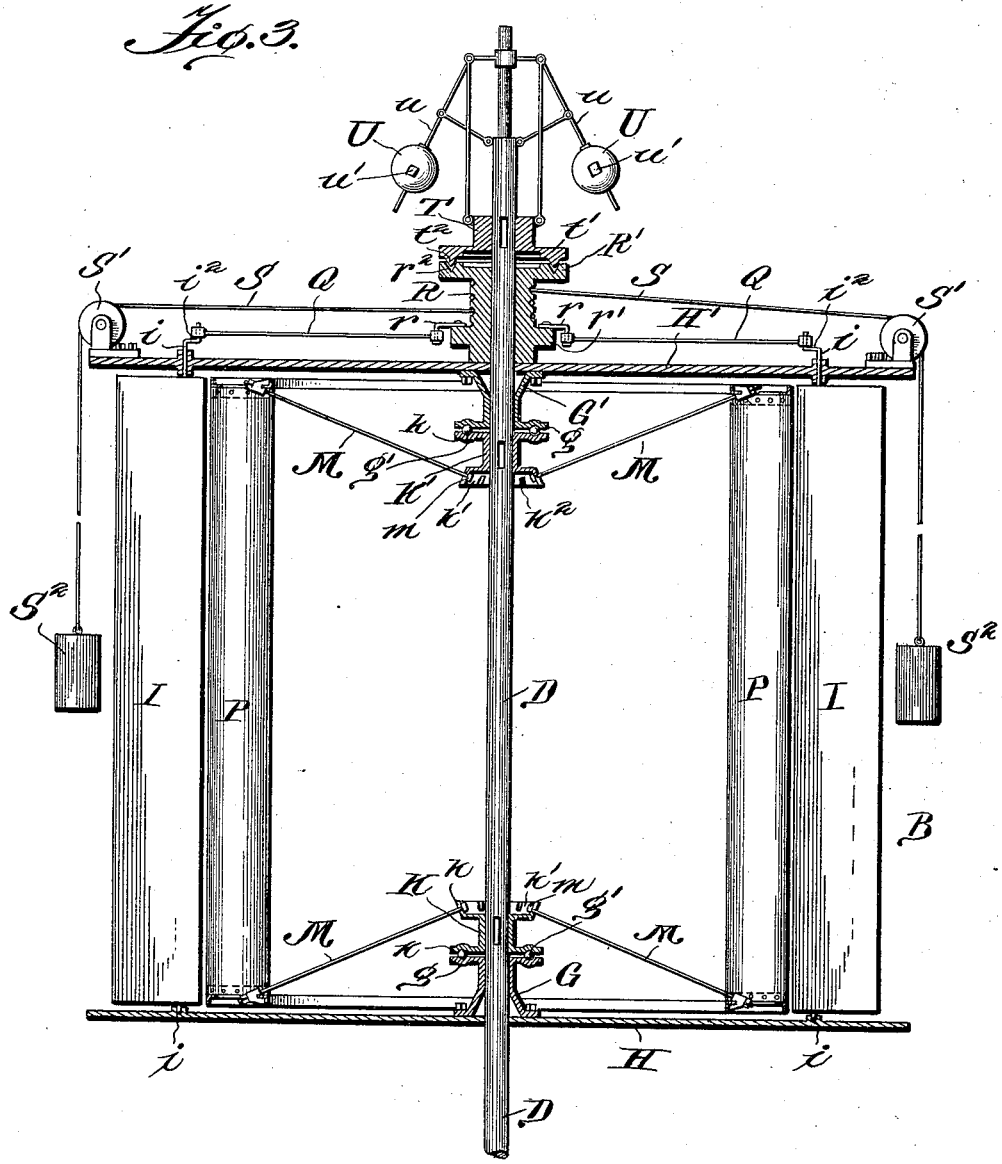

F. W. HIBBS.
WIND PROPELLED TURBINE MOTOR.
APPLICATION FILED JAN. 18, 1910.
1,008,148.
Patented Nov. 7, 1911.
5 SHEETS—SHEET 3.
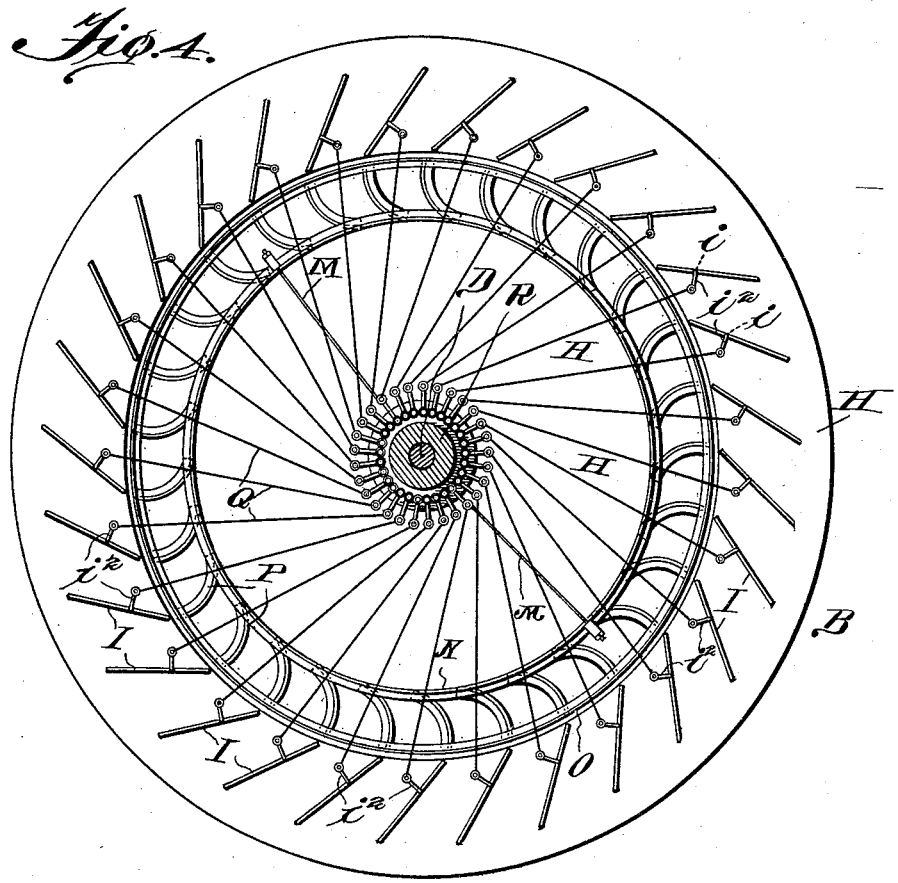
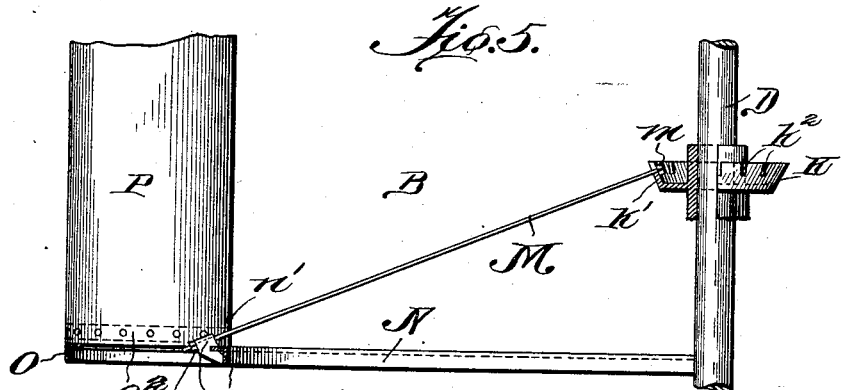

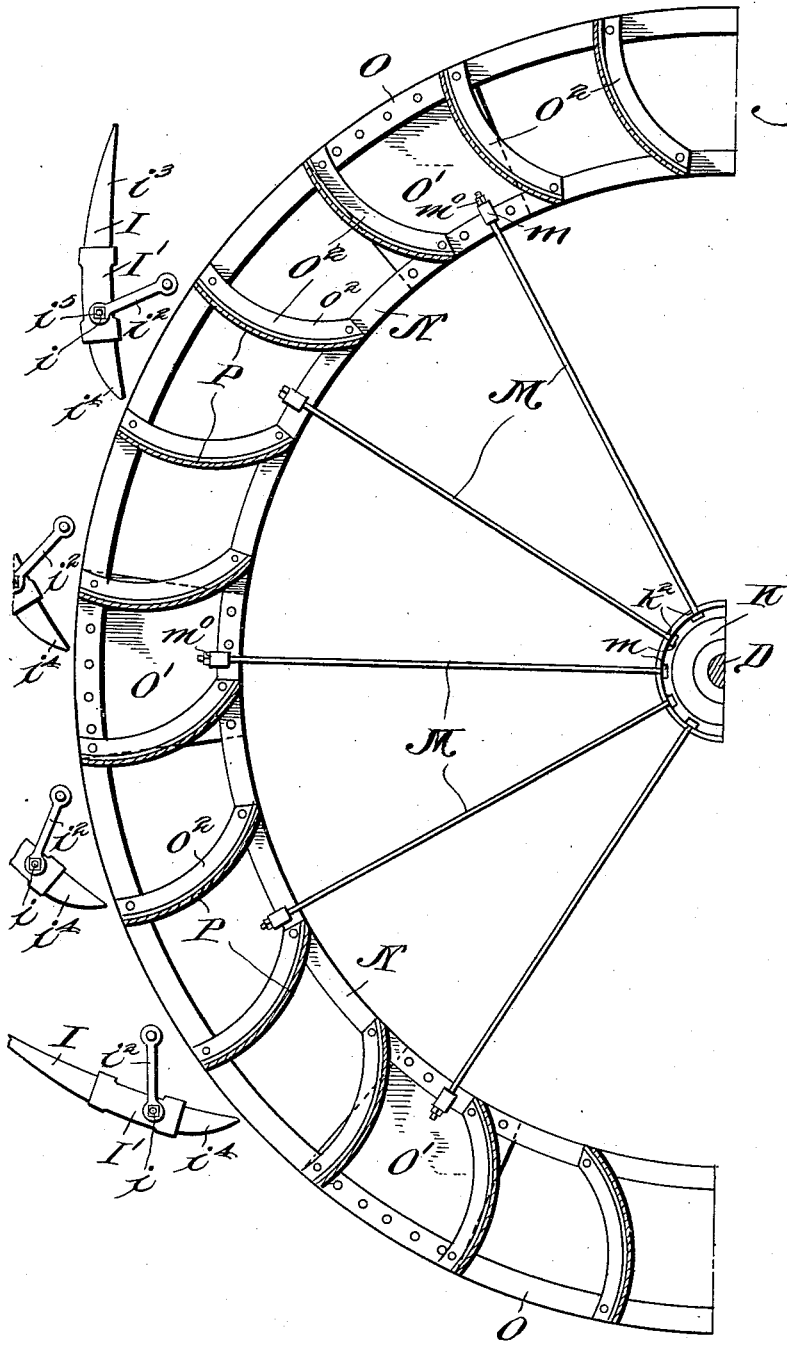

F. W. HIBBS.
WIND PROPELLED TURBINE MOTOR.
APPLICATION FILED JAN. 18, 1910.
1,008,148.
Patented Nov. 7, 1911.
5 SHEETS—SHEET 5.
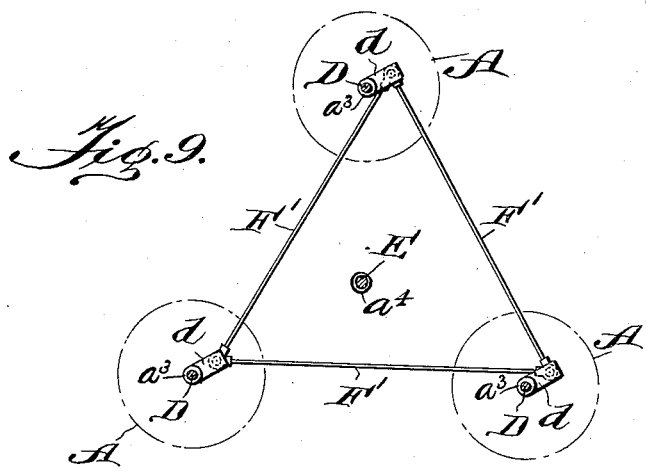
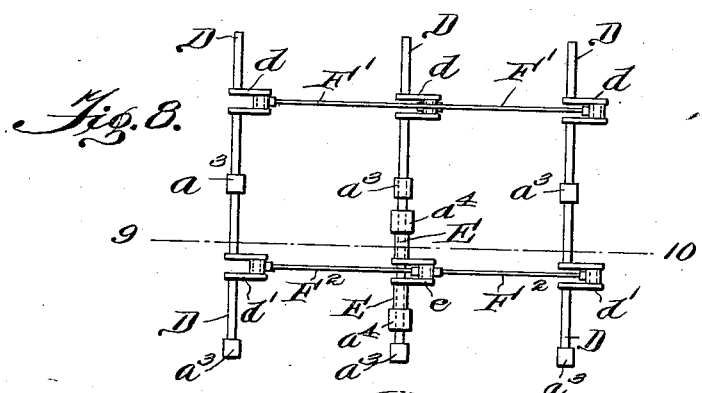
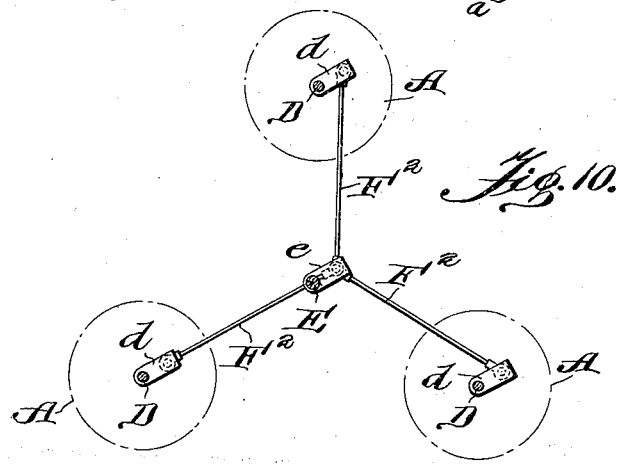

UNITED STATES PATENT OFFICE.

FRANK W. HIBBS, OF SEATTLE, WASHINGTON.

WIND-PROPELLED TURBINE-MOTOR.

1,008,148.  Specification of Letters Patent.  Patented Nov. 7, 1911.

Application filed January 18, 1910. Serial No. 538,787.

*To all whom it may concern:*

Be it known that I, FRANK WARREN HIBBS, a citizen of the United States, residing at Seattle, in the county of King and State of Washington, have invented certain new and useful Improvements in Wind-Propelled Turbine-Motors; and I do hereby declare the following to be a full, clear, and exact description of the invention, such as will enable others skilled in the art to which it appertains to make and use the same.

My invention relates to improvements in wind propelled turbine motors, and it is intended to provide an apparatus in which the air currents are caused to impinge upon the rotating blades in the manner of impact turbines.

My invention provides means whereby a series of superimposed air turbines are each connected to a common vertical shaft and drive the same; and also whereby the several groups of such superimposed units, each group driving its own shaft, are connected to a common driven shaft, so that the power of the entire system is applied to said driven shaft, and from it applied to any use desired.

My invention also relates to improved means for automatically controlling the speed of each shaft by automatically regulating the supply of air admitted to the rotating vanes; and also it relates to certain other novel details of construction and combinations and arrangements of the parts as will be hereinafter described and claimed.

Figure 1:
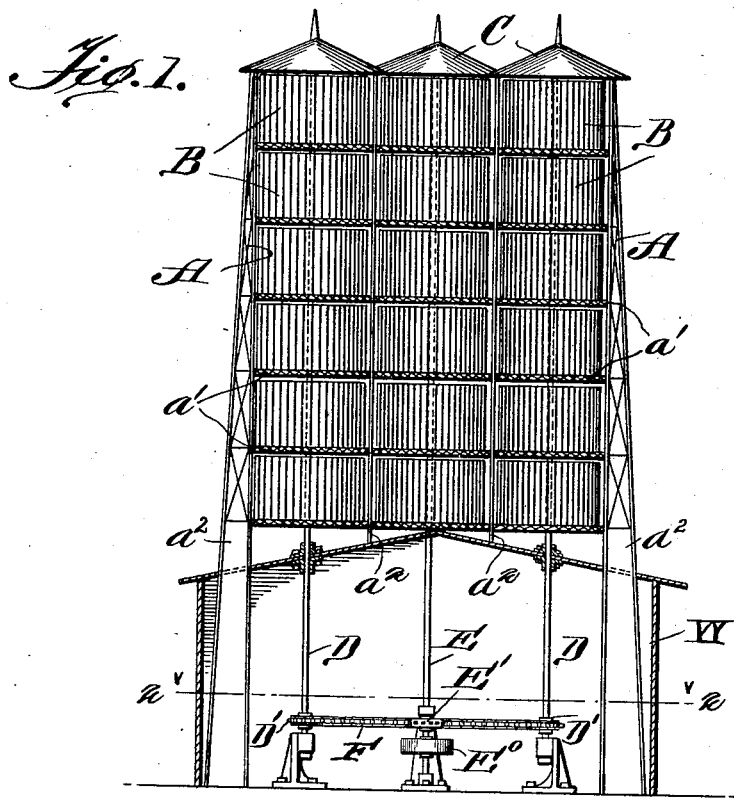
Figure 2:
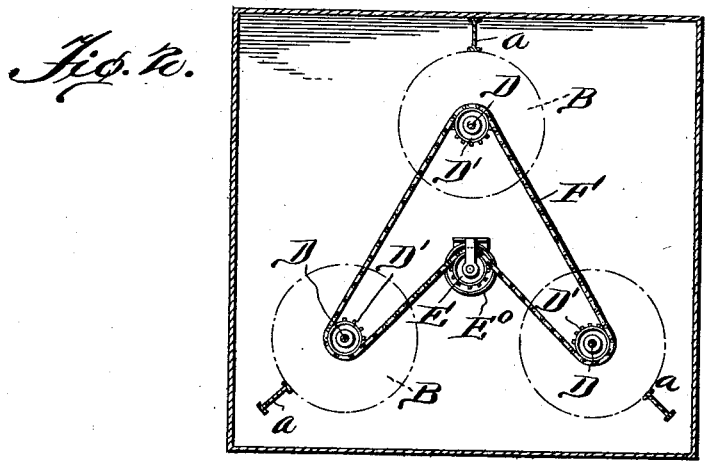

Figure 1 is a front elevation of three groups of superimposed units, each group connected to its shaft, and the three shafts connected to a driven shaft, the said groups being mounted above a building shown in section. Fig. 2 shows a section along the line 2—2 of Fig. 1, and looking in the direction of the arrows. Fig. 3 shows a central vertical section through the upper unit of the system, and illustrates the construction of the turbine vanes and the guide blades; and also illustrates the automatic control of the speed of the shaft. Fig. 4 shows a diagrammatic plan view of the interior of one of the units, parts being omitted for the sake of clearness in the drawings. Fig. 5 is a detail showing the means of supporting the turbine vanes from the vertical shaft. Fig. 6 is a detail showing the attachment of one of the supporting rods to the inner ring carrying the turbine vanes. Fig. 7 is a horizontal section through the turbine vanes and guide blades on a larger scale, parts being omitted for the sake of clearness in the drawings. Fig. 8 is a side elevation showing means for causing the several rotor shafts to operate synchronously. Fig. 9 is a diagrammatic view of the shaft connections, the shafts being shown in section along the line 9—10 of Fig. 8, the bearings being omitted, and looking upward in said figure, and Fig. 10 is a similar view looking downward.

Figs. 1 and 2 show three groups of superimposed turbine units B, symmetrically disposed and mounted in a rigid framework A, which framework has suitable pillars $a$ horizontal girders $a'$, and vertical girders $a^2$; but any suitable framework may be employed. The units should be mounted preferably in an elevated position, such as above a workshop or factory W.

In Fig. 1 three groups each of six superimposed units B, are shown, each unit driving a shaft D, and the three shafts driving a fourth shaft E. These shafts are connected together to revolve synchronously as by sprocket wheels D' engaging the sprocket chain F which meshes with the sprocket wheel E' on the driven shaft E. The shaft E carries a pulley $E^0$, by means of which the power may be transmitted where needed. Instead of the sprocket wheels and chains, any suitable gearing may connect the three shafts D to the driven shaft E.

In Figs. 8 to 10 I have shown means for connecting the three rotor shafts to the main driving shaft, whereby perfect synchronism of the various shafts is secured.

Fig. 8 shows a side elevation in which the three rotor shafts D are journaled in bearings $a^3$ attached to the framework of the apparatus.

E represents the driven shaft mounted in bearings $a^4$. The shafts D and E have cranks $d$ and $e$ respectively. The upper series of cranks shown in Fig. 9 and in the upper part of Fig. 8 are connected together by connecting rods F', and the lower series of cranks $d'$ are connected by connecting rods $F^2$ to the crank $e$ on the driven shaft E.

It will be noted that the connecting rods F' of Fig. 9 will form a swinging frame which will cause any excessive pressure on one of the shafts D to be transmitted to the other two shafts, while the connecting rods $F^2$ of Fig. 10 will transmit the force applied to all the shafts D to the driven shaft E, which driven shaft is connected to the driven mechanism in any convenient way, not shown.

It will be noted that in the arrangement shown in Figs. 1 and 2, the three shafts D must necessarily move at the same velocity, and excess of pressure on any shaft will be distributed to the other shafts, so that the system will have a uniform rate of speed of all the rotating parts of each unit. Suitable covers C for the upper rotor units may be provided. The groups of units may be independently regulated by means of the automatic arrangement shown in Fig. 3, which figure also shows the construction and arrangement of the rotor carrying the turbine vanes, and of the adjustable guide blades directing the air currents to said vanes. Referring to said figure, G and G' are two bearings attached respectively to the floor and ceiling H and H' of the unit B. The shaft D passes through these bearings, and carries sleeves K and K' splined on said shaft, and having flanges $k$ co-acting with the flanges $g$ of the bearings G and G' to receive the balls $g'$, thus forming an anti-friction bearing, on the lower one of which the weight of the rotor is supported independent of the shaft. Trunnioned as at $i$ to floor H and ceiling H' are the guide blades I, which are simultaneously controlled, as will be hereinafter described. The sleeves K and K' have cup shaped members $k'$, slotted as at $k^2$ to engage the rods M, whose heads $m$ are held behind said slots, and the other ends of said rods are connected to clips M' shown in Figs. 5 and 6, which clips are slotted as at $m'$ to receive the upper flange of the ring N, the cross section of which ring is preferably in the form of an angle iron with vertical web $n$ and horizontal web $n'$. The rib $m^2$ of the clip M' bears against the vertical web $n$ of said ring N, while the horizontal web $n'$ of said ring projects into said slot $m'$. The tension on the rod M may be adjusted by screwing up on the nut $m^0$, (see Fig. 6). Exterior to the ring N and connected thereto by the plates O' and the curved angle irons $O^2$ is an outer rotating ring O. There are similar rings N and O on the top and bottom of the apparatus, which are connected together by the vertical curved turbine vanes P, as shown in Figs. 3 and 7. Thus these two sets of rings, with the plates O', the curved angle irons $O^2$, and the turbine vanes P, form an annular frame, which is connected to the fixed hubs K and K' on the shaft D by means of the rods or spokes M. The blades P are curved in horizontal section, rectilinear in vertical section, and have their curved side in the direction of rotation. These blades drive and rotate with the shaft D.

Annularly disposed, exterior to the turbine vanes, are the guide blades or louvers I, shown diagrammatically in Fig. 4, but shown in detail in Fig. 7. These guide blades are provided with trunnions $i$ carried by the plates I', fastened to the top and bottom of the blades, and projecting from the trunnions are cranks $i^2$ connected by the rods Q to the arms $r$, carried by the flange $r'$ of the drum R, loose on the shaft D. These guide blades when in the farthest open position should be at an angle of not over 45° with the tangent to the outer ring O, and when in the closed position should be nearly, or quite parallel to said tangent. There should preferably be approximately one half, more or less, as many guide blades as there are curved vanes. Ropes S are wound around this drum R, which pass over pulleys S' and terminate in weights $S^2$. The tendency of these weights is to cause drum R to remain permanently in that position in which the guide blades are farthest open, and the weights will normally be sufficient to restore the parts to this position when the drum is loose on the shaft D. In order, however, to automatically close or partly close these guide blades or louvers when the speed of the shaft D becomes excessive, I provide a clutch member R' having engaging groove $r^2$, which clutch member is secured to drum R, loose on the shaft D, and I also provide another clutch member T, having engaging surfaces $t'$, adapted to engage the parts $r'$ and $r^2$ when the balls U of the governor are thrown upward under the action of centrifugal force. It will be noted that when these balls are thrown upward, the clutch member T will be caused to engage the drum R, and will cause said drum to rotate with said shaft, winding up the ropes S and hoisting the weights $S^2$. The rotation of the drum R will rock the guide blades to a nearly or entirely closed position, throttling down the supply of air, and causing the apparatus to slow down. As soon as the speed of the shaft D decreases sufficiently, the governor will lift the clutch member T out of engagement with the drum R, and the weights $S^2$ will descend, rotating the drum and restoring the guide blades to a wholly or partly open position. As soon as the apparatus speeds up again the governor will act once more, winding up the weights, and when the apparatus slows down again, the weights will again take charge, so that the guide blades are automatically controlled by the speed of the rotation of the shaft D, and the inertia of the parts carried thereby. This insures the application of great power to the movement of the guide blades when the speed of the shaft becomes excessive, and these guide blades can thus be efficiently operated, no matter how large the apparatus may be.

The curved vanes P are set at an angle to the radii of the rotor, and after a series of experiments it has been determined that the radial width of these vanes should not be more than one-tenth of the maximum radius of the rotating wheel, and not less than one-twentieth of the same radius. They should be spaced one from another such a distance as will insure that the ratio of the outer circumference of the rotating wheel, divided by the pitch of the vanes, shall be not more than 150 and not less than 30.

The concentrating louvers or guide blades should be set so that when they are in the open position their inner ends shall just clear the outer circumference of the rotating wheel. The distance between the pivot centers of the guide blades should be anywhere from once to twice the distance between the outer edges of the curved vanes, and the length of these blades should be such that they should act like closed shutters and effectually screen the rotor from wind when said guide blades are in the closed position.

It will be noted that the air currents passing between the guide blades will pass through the openings between the turbine vanes, and will react on same after the manner of an impact turbine.

It will be noted that the various parts are interchangeable and that the entire system may be readily assembled or disassembled when desired, and new units added or new parts substituted for old whenever desired, without entailing material difficulty. Thus with regard to the rods M, their heads $m$ may be dropped behind the slots $k^2$, and the clips M', at their other ends, may be readily connected with the ring N, and the nuts $m^0$ may be quickly screwed up. It will be obvious that the governing attachment shown in Fig. 3 may be placed below the rotor instead of above, should this be desired, in which case the drum R and rods Q would be below the rotor unit instead of above, as shown.

By having the groups of units symmetrically disposed, as in the triangles shown in Figs. 1 and 2, the same surface area will be presented to the wind, irrespective of the direction of said wind, but dependent, of course, upon the area of the opening between the guide blades, which area would be regulated by the governing device, as hereinbefore described.

In order to regulate the speed at which the governor operates, any well known adjustment may be provided, such as, for instance, sliding the weights U up and down on the arms $u$ and locking the same at the desired position by means of clamp screws $u'$. It will be obvious that the centrifugal effect of the governor will be increased by increasing the radius at which the weights rotate.

It will be noted that the governor does not directly actuate the mechanism for swinging the guide blades, but it merely operates the clutch, which couples the drum onto the shaft D and causes the inertia of the moving parts to swing the guide blades about their pivots against the action of the weights $S^2$.

I do not desire to limit myself to any specific form of governor, as there are many well known types of governors which might be adopted for use in this connection, nor do I mean to limit myself to the precise construction and arrangement of parts, as numerous modifications might be made which could be used without departing from the spirit of my invention.

Having thus described my invention, what I claim and desire to secure by Letters Patent of the United States is:

1. A wind propelled turbine system comprising a plurality of shafts, means for connecting said shafts together, a series of superposed rotors carried by each shaft and driving same, means independent of each shaft for supporting the weights of each rotor, a plurality of pivoted guide blades annularly disposed and exterior to said rotors, clutch mechanism carried by each shaft, and an automatic governor operated by the rotation of each shaft for throwing said clutch mechanism into and out of engagement, means operated by said clutch mechanism for swinging said guide blades about their pivots in one direction, and weights carried by ropes secured to the clutch mechanism adapted to restore the blades to their initial position when said clutch mechanism is released, substantially as described.

2. A wind propelled turbine system comprising a plurality of shafts, means for connecting said shafts together, a series of superposed rotors carried by each shaft and driving same, each rotor comprising an annular frame connected to said shaft, a plurality of curved vanes carried by said annular frame, a plurality of pivoted guide blades annularly disposed and exterior to said rotors, clutch mechanism carried by each shaft, and an automatic governor operated by the rotation of each shaft for throwing said clutch mechanism into and out of engagement, means controlled by said clutch mechanism for rocking said guide blades about their pivots in one direction, and weights carried by ropes secured to the clutch mechanism adapted to restore the blades to their normal position when said clutch mechanism is released, substantially as described.

3. A wind propelled turbine system comprising a shaft, a series of superposed rotors carried by said shaft and driving same, each rotor comprising an annular frame, rods connecting said annular frame to said shaft, curved vanes carried by said annular frame, a plurality of pivoted guide blades annularly disposed and exterior to said rotors, means operated by the rotation of said shaft for automatically swinging said guide blades about their pivots in one direction, and weights controlled by said shaft adapted to restore the blades to their normal position, substantially as described.

4. A wind propelled turbine system comprising a shaft, a series of superposed rotors carried by said shaft and driving same, each rotor comprising an annular frame, rods connecting said annular frame to said shaft, curved vanes carried by said annular frame, means independent of said shaft for supporting the weight of each rotor, a plurality of pivoted guide blades annularly disposed and exterior to said rotors, clutch mechanism carried by said shaft, and an automatic governor operated by the rotation of said shaft for throwing said clutch mechanism into and out of engagement, and means controlled by said clutch mechanism for operating said guide blades, substantially as described.

5. In a wind propelled turbine motor, a rotor comprising an annular frame, a series of vertical vanes curved in horizontal section and rectilinear in vertical section carried by said frame, a shaft concentric with said annular frame, rods connecting said annular frame with said shaft, means independent of said shaft for supporting the weight of said rotor, in combination with a series of guide blades pivoted in a circle exterior to said annular frame, each of said blades being limited to turn through an angle of not over 45° with a tangent to the circle passing through its pivot and that of the other blades, a drum loosely mounted on said shaft, a clutch carried by said shaft adapted to engage the drum, a governor for throwing said clutch into and out of engagement with the drum, means controlled by the drum for rocking said guide blades about their pivots in one direction, and weights carried by ropes secured to the drum adapted to restore the blades to their normal position when said drum is released, substantially as described.

6. In a wind propelled turbine motor, a rotor comprising an annular frame, a series of vertical vanes curved in horizontal section and rectilinear in vertical section carried by said frame, the said vanes being curved in the direction of rotation, and their radial width being not less than one-twentieth nor more than one-tenth of the maximum radius of each rotor, a shaft concentric with said annular frame, rods connecting said annular frame with said shaft, in combination with a series of guide blades pivoted in a circle exterior to said annular frame, each of said blades being limited to turn through an angle of not over 45° with a tangent to the circle passing through its pivot and that of the other blades, with means for simultaneously rocking all of said guide blades about their respective pivots, substantially as described.

In testimony whereof, I affix my signature, in presence of two witnesses.

FRANK W. HIBBS.

Witnesses:
 C. B. LAMONT,
 M. MAX. DUVALL.

---

Copies of this patent may be obtained for five cents each, by addressing the "Commissioner of Patents, Washington, D. C."